May 10, 1966     P. N. MINIHAN     3,250,135
GYROSCOPES
Filed July 29, 1963
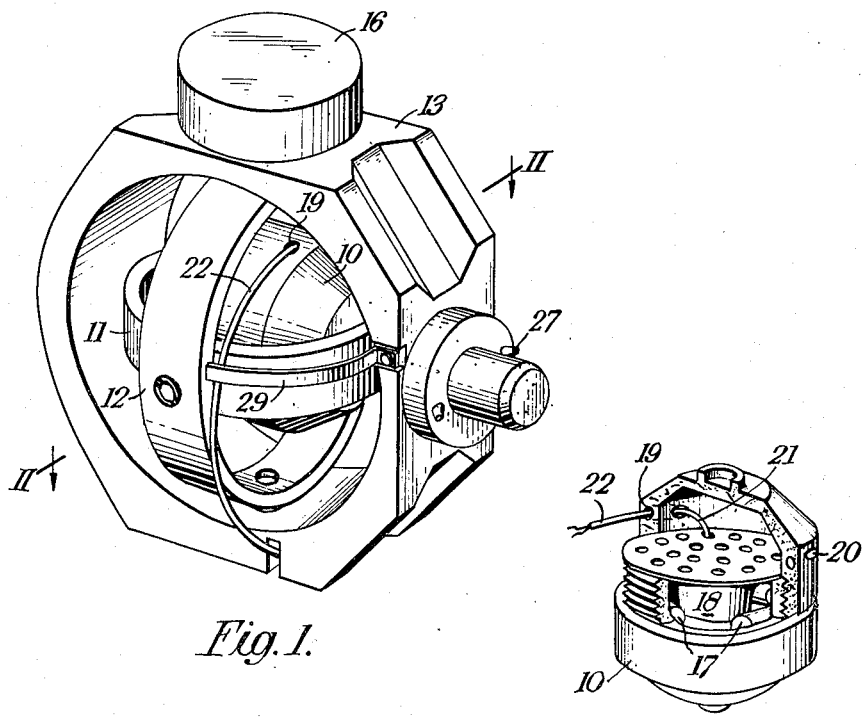
Fig. 1.
Fig. 3.
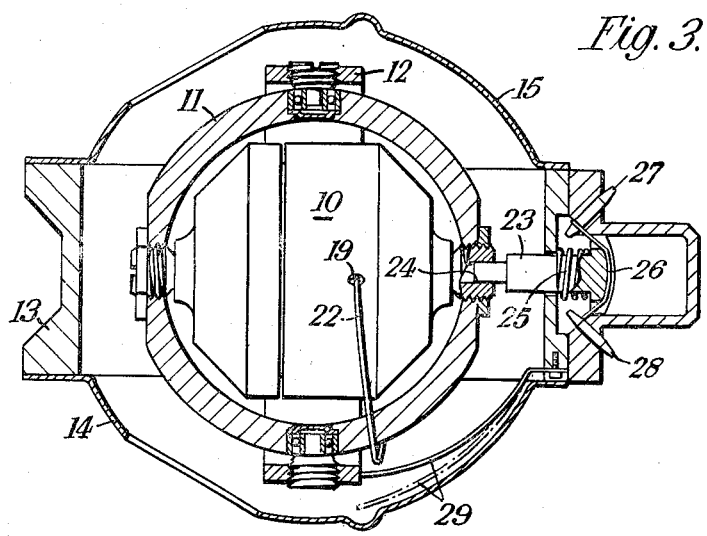
Fig. 2.
Inventor
Patrick Nicholas Minihan
By Cushman, Darby & Cushman
Attorneys 3,250,135
GYROSCOPES
Patrick Nicholas Minihan, Belfast, Northern Ireland, assignor to Short Brothers & Harland Limited, Belfast, Northern Ireland, a British company
Filed July 29, 1963, Ser. No. 298,343
Claims priority, application Great Britain, Aug. 13, 1962, 31,040/62
5 Claims. (Cl. 74—5.1)

The present invention relates to gyroscopes and is particularly concerned with a caging device therefor.

In our British patent specification No. 842,775 there is described a free gyroscope comprising a generally spherical rotor which is supported in two conventionally disposed annular inner and outer gimbals which are arranged to pivot about axes which intersect at right angles to each other. The outer gimbal is pivotally mounted in a casing enclosing the whole assembly, and in the specific embodiment described in this specification it is proposed that a potentiometer be provided for the indicating the angular position of the outer gimbal with respect to the casing.

The rotor contains a combustion chamber in which is provided a combustible charge and an electrical igniter or primer, and the walls of the rotor are pierced by two diametrically opposed passages arranged tangentially with respect to the rotor axis so as to constitute jet discharge nozzles, whereby the gases generated by combustion of the charge are ejected through the nozzles and are effective to impart rotary driving motion to the rotor.

In this prior arrangement means are provided for caging the gyroscope prior to firing, the caging means including a spring-loaded stud which is mounted in the casing and held against the action of its spring in engagement with the inner gimbal to prevent rotation of the latter about its supporting pivots. The stud is automatically released to free the inner gimbal when the combustion charge in the rotor is fired.

Although the above caging mechanism serves to lock both the inner and outer gimbals of the gyroscope against rotation, it has been found that as a result of tolerances provided for in the manufacture of the component parts of the gyroscope there is some degree of slackness in the assembly which permits the outer gimbal to turn through a very small angle even though the inner gimbal is locked as described. During transportation, the gyroscope becomes subjected to continual vibration and it has been found that the resulting movement of the outer gimbal gives rise to undue wear of the potentiometer element associated with it. It is accordingly one object of the present invention to provide additional caging means to overcome this disadvantage.

According to the present invention there is provided a free gyroscope comprising inner and outer gimbals conventionally arranged to support a rotor, and caging means comprising a first locking device mounted on the casing and adapted to engage the inner gimbal to hold it against rotation about its rotary axis, and a further locking device in the form of a resilient member mounted on the gyroscope casing and adapted to bear against the outer gimbal in such a manner as to apply a force thereto about its rotary axis and thereby take up any slackness in the assembly, the arrangement being such that the resilient member can be released when the gyroscope requires to be uncaged so as to move to a position clear of the outer gimbal.

One embodiment of the invention will now be described by way of example with reference to the accompanying drawings in which, FIG. 1 is a schematic perspective view of a gyroscope according to the invention, FIG. 2 is a sectional plan view of the gyroscope shown in FIG. 1, the section being taken on the lines II—II in FIG. 1, and FIG. 3 is a part cut-away perspective view of the rotor employed in the gyroscope shown in FIG. 1.

Referring to the drawings it will be seen that the gyroscope comprises an approximately spherical rotor 10, which is supported in two conventionally disposed inner and outer gimbals 11 and 12 which are arranged to pivot about axes which intersect at right angles to each other. The outer gimbal 12 is pivotally mounted in a frame 13 to which are attached cover plates 14 and 15 serving as a casing for the gyroscope. A potentiometer 16 is provided for indicating the angular position of the gimbal 12.

Referring now to FIG. 3, the rotor 10 includes a combustion chamber in which is provided a combustible charge consisting of a plurality of solid fuel cartridges 17, and the chamber also inculdes an electric igniter or primer 18. The walls of the rotor 10 are pierced by two diametrically opposed passages 19 and 20 arranged tangentially with respect to the rotor axis and constituting jet discharge nozzles such that the reaction of gases generated by combustion of the charge 17 will be effective to impart rotary driving motion to the rotor 10.

The charge 17 is capable of being ignited by the primer 18, in which is embedded a low tension electric fuse. This fuse is connected to an external power source through conductor wires 21 which are led to the interior of the rotor 10 through the jet nozzle 19, and the arrangement is such that the wires 21 are severed upon ignition to permit free rotation of the rotor 10 To avoid interference by the wires 21 with the operation of the gyroscope, they are passed into the rotor through a hollow curved spring 22, which is attached at one end to the frame 13 and is arranged at the other end to extend into the rotor nozzle 19 in such manner that it would exert a light force passing through the rotor axis.

The inner gimbal 11 is locked to the frame 13 by a spring-loaded bolt 23 mounted in the frame and arranged to engage a socket 24 in the gimbal 11, the bolt 23 being held against its spring 25 by a length of electrical fuse wire 26 which is anchored at its ends to terminal pins 27 and 28. The geometry of the apparatus is such that the outer gimbal is also substantially restrained when the inner gimbal is locked by the bolt 23.

So long as the fuse wire 26 remains intact, its presence across the head of the bolt 23 prevents the retraction of the bolt by its spring, and means are provided for passing a fusing current through the wire 26 at the required instant. The fusing circuit may be closed simultaneously with the energisation of the firing circuit for the rotor charge, the required delay in fusing the restraining wire 26 being achieved by making the latter of an appropriate gauge or material.

Although the bolt 23 serves to lock both the inner and outer gimbals, there is some degree of slackness in the assembly which permits the outer gimbal to turn through a very small angle. Such movement is prevented by providing in accordance with the invention a further locking device comprising a curved leaf spring 29 fixedly mounted at one end to the frame 13 and adapted to bear at its other end upon one side of the outer gimbal 12 at a position substantially mid-way between the supporting pivots of the latter.

The leaf spring 29 is of arcuate form and is bowed so as to follow the periphery of the inner gimbal 11 and provide the required loading on the outer gimbal 12. By applying an outwardly directed force on the leaf spring the latter is brought clear of the outer gimbal, and moves by virtue of its own resilience to a position close to the cover 14 and clear of the outer gimbal 12.

In operation, upon the ignition of the combustion charge and rotation of the rotor, the tubular spring 22 is freed from the rotor 10 and springs back to a position close to the cover 14 and clear of the inner and outer gimbals 11 and 12. During this movement the tubular spring 22 strikes the retaining leaf spring 29 causing or assisting the latter to move clear of the outer gimbal 12, whereupon both the tubular spring 22 and the leaf spring 29 move under their own resilience to positions close to the inside surfaces of the cover 14.

In an alternative embodiment of the invention, the outwardly directed force required to cause the leaf spring 29 to disengage from the gimbal 12 is provided by the blast from the rotor nozzles when the rotor is set in operation.

What I claim as my invention and desire to secure by Letters Patent is:

1. A free gyroscope comprising inner and outer gimbals conventionally arranged to support a rotor, and caging means comprising a first locking device mounted on the casing and adapted to engage the inner gimbal to hold it against rotation about its rotary axis, and a further locking device in the form of a resilient member mounted on the gyroscope casing and adapted to bear against the outer gimbal in such a manner as to apply a force thereto about its rotary axis and thereby take up any slackness in the assembly, the arrangement being such that the resilient member can be released when the gyroscope requires to be uncaged so as to move to a position clear of the outer gimbal.

2. A gyroscope according to claim 1, wherein the resilient member is in the form of a spring fixedly mounted at one end to the gyroscope casing and adapted to bear at its other end upon one side of the outer gimbal at a position midway or substantially midway between the supporting pivots of the latter.

3. A gyroscope according to claim 2, wherein the spring is a leaf spring of arcuate form and is bowed to follow the periphery of the inner gimbal and to provide the required loading on the outer gimbal, the arrangement being such that upon the application of an outwardly directed force on the leaf spring, the latter is brought clear of the outer gimbal and moves by virtue of its own resilience to a position close to the gyroscope casing and clear of the outer gimbal.

4. A gyroscope according to claim 3, comprising a further resilient member held in a retracted position by the rotor when the latter is stationary and released by the rotor at the commencement of rotary movement thereof so as to move under its own resilience through a path in which it strikes the leaf spring causing the latter to move clear of the outer gimbal, whereupon the further resilient member and the leaf spring move under their own resilience to positions close to the inside surface of the gyroscope casing.

5. A gyroscope according to claim 4, wherein the inner resilient member comprises a hollow spring through which an ignition lead is led to the rotor for combustion of a charge therein.

References Cited by the Examiner
UNITED STATES PATENTS

| | | | |
|---|---|---|---|
| 3,012,439 | 12/1961 | Ransom | 74—5.12 |
| 3,086,400 | 4/1963 | Barnes | 74—5.12 X |
| 3,162,053 | 12/1964 | Blitz | 74—5.7 |

BROUGHTON G. DURHAM, *Primary Examiner.*

J. D. PUFFER, *Assistant Examiner.*